United States Patent
Fjällström

[11] Patent Number: 5,120,282
[45] Date of Patent: Jun. 9, 1992

[54] VEHICLE TRANSMISSION SYSTEM

[76] Inventor: Bengt Fjällström, Södra Kungsvägen 9, S-522 00 Tidaholm, Sweden

[21] Appl. No.: 597,669

[22] Filed: Oct. 16, 1990

[51] Int. Cl.$^5$ .................... F16H 37/06; B60K 1/02
[52] U.S. Cl. .................... 475/5; 475/151; 180/65.4
[58] Field of Search .................... 475/1, 2, 5, 6, 151; 180/65.4

[56] References Cited

U.S. PATENT DOCUMENTS

| | | | |
|---|---|---|---|
| 2,138,231 | 11/1938 | Gebhardt | 180/65.4 X |
| 2,196,368 | 4/1940 | Thomson | 475/1 X |
| 2,205,999 | 6/1940 | Bartlett et al. | 180/65.4 X |
| 3,421,596 | 1/1969 | Christenson et al. | 180/65.4 X |
| 3,620,323 | 11/1971 | Maeda | 475/5 X |
| 3,699,351 | 10/1972 | Addie | 475/151 X |
| 3,921,745 | 11/1975 | McCulloch et al. | 180/65.4 X |
| 3,923,115 | 12/1975 | Helling | 475/5 X |
| 4,423,794 | 1/1984 | Beck | 475/5 X |
| 4,588,040 | 5/1986 | Albright, Jr. et al. | 180/65.4 X |
| 4,953,646 | 9/1990 | Kim | 180/65.4 |

FOREIGN PATENT DOCUMENTS

| | | | |
|---|---|---|---|
| 828187 | 7/1949 | Fed. Rep. of Germany | 475/1 |
| 2500760 | 7/1976 | Fed. Rep. of Germany | 475/1 |

Primary Examiner—Allan D. Herrmann
Assistant Examiner—Ryan W. Massey

[57] ABSTRACT

This invention is concerned with vehicle transmission systems of the kind which include at least one transmission drives shaft, at least one motor generator and at least one planetary gear means comprising a plant gear, sun gear and an outer ring. The motor generator engages the sun gear through the intermediary of a gear transmission assembly and the relative speed between the outer ring and the drive shaft is controlled by supplying energy to and taking energy from the motor generator. The sun gear is rotatably journaled on the drive shaft, and the drive shaft is connected rigidly to the journalling points of the planet gears. The primary force is transmitted from the motor generator to the outer ring of the planetary gear means through the intermediary of a force transmission gear. As a result of this arrangement, when the sun gear is retarded by the motor generator, through the gear transmission assembly, the journaling points of the plant gears will rotate around the gear center and drive the drive shaft, irrespective of retardation of the sun gear.

5 Claims, 1 Drawing Sheet

VEHICLE TRANSMISSION SYSTEM

BACKGROUND OF THE INVENTION

The present invention relates to a vehicle transmission system for driving the drive shaft (or shafts) of a vehicle continuously at variable speed. The transmission includes the combination of at least one electric motor generator and planetary or epicyclic gear means, comprising an outer ring, planet gears and a sun gear.

Summary of the Invention

The object of the present invention is to provide a novel type of vehicle transmission system to which a conventional power plant, e.g. an internal combustion engine, and an electric motor can be connected in parallel, with the electric motor also capable of functioning as a generator, i.e. a motor generator, by which is meant a device capable of producing electric current and also of producing a driving force.

The inventive system is mainly characterized in that the motor generator engages the sun gear through the intermediary of a gear transmission means, and in that the relative speed of the outer ring and the drive shaft, or shafts, is controlled by supplying energy to and taking energy from the motor generator. The sun gear is rotatably journaled on the drive shaft, which in turn has rigid connection with the journaling points of the planet gear, and the primary force is transmitted from the motor generator to the outer ring through a force transmission gear.

According to one preferred embodiment of the invention, the journaling points of the planet gear or gears are located on an end plate which is mounted on the drive shaft.

According to another embodiment of the invention, the vehicle transmission system includes two planetary gear means which are in mirror image with one another and each of which includes a motor generator having gear transmission means.

The energy generated by the motor generators is consumed, either totally or partially, by a further generator motor when the vehicle is driven forwards, and the two planet gears have a mutually common outer ring.

The invention is based on the concept of controlling vehicle speed in the differential of the terminal gear. The conventional terminal gear is then replaced preferably with two planetary gear means arranged in mirror image with one another and each planetary gear means functions to control continuously the speed of a respective vehicle drive wheel, or like traction device.

Vehicle speed is controlled through the motor generators and the driven planetary gears.

One advantage afforded by the inventive transmission system is that the speed of the drive motor, which may be a conventional internal combustion engine, can be held constant at varying traction. This enables the drive motor, or engine, to work at optimum efficiency with the subsequent minimization of harmful exhaust gases.

Another advantage is that the vehicle can be driven in low gear solely by the motor generators themselves, by locking the outer ring of the planetary gear means. This feature in combination with the ability of charging the vehicle battery (or batteries) from an external battery charging source will enable the vehicle to be driven in the absence of exhaust emissions, even with limited battery capacity, which is highly beneficial when the vehicle is driven in a densely populated or built-up area.

Other advantages afforded by the inventive transmission system are found in the possibility of excluding the generator, start motor, clutch mechanism and gear box of conventional vehicles. The vehicle can also be driven and manipulated more readily when there is no need to change gear. This is particularly true when traction is limited and when there is a need for restricted vehicle speed, or when the vehicle engine concerned has a high drive torque.

Because the vehicle can be driven at a constant, low speed, the exhaust gases will be cleaner than is otherwise the case. The inventive transmission system also enables energy to be recovered, by braking the vehicle initially through the motor generators. A four-wheel drive can also be readily installed on vehicles equipped with the inventive transmission system.

Another important advantage afforded by the present invention is that the transmission system enables vehicles to be driven solely by electrical energy in towns and cities, even with limited battery capacity, without the need of large action radii.

BRIEF DESCRIPTION OF THE DRAWINGS

So that the invention will be more readily understood and further features thereof made more apparent, exemplifying embodiments of the invention will now be described in more detail with reference to the accompanying drawings, in which.

DESCRIPTION OF THE PREFERRED EMBODIMENTS

Figure 1:
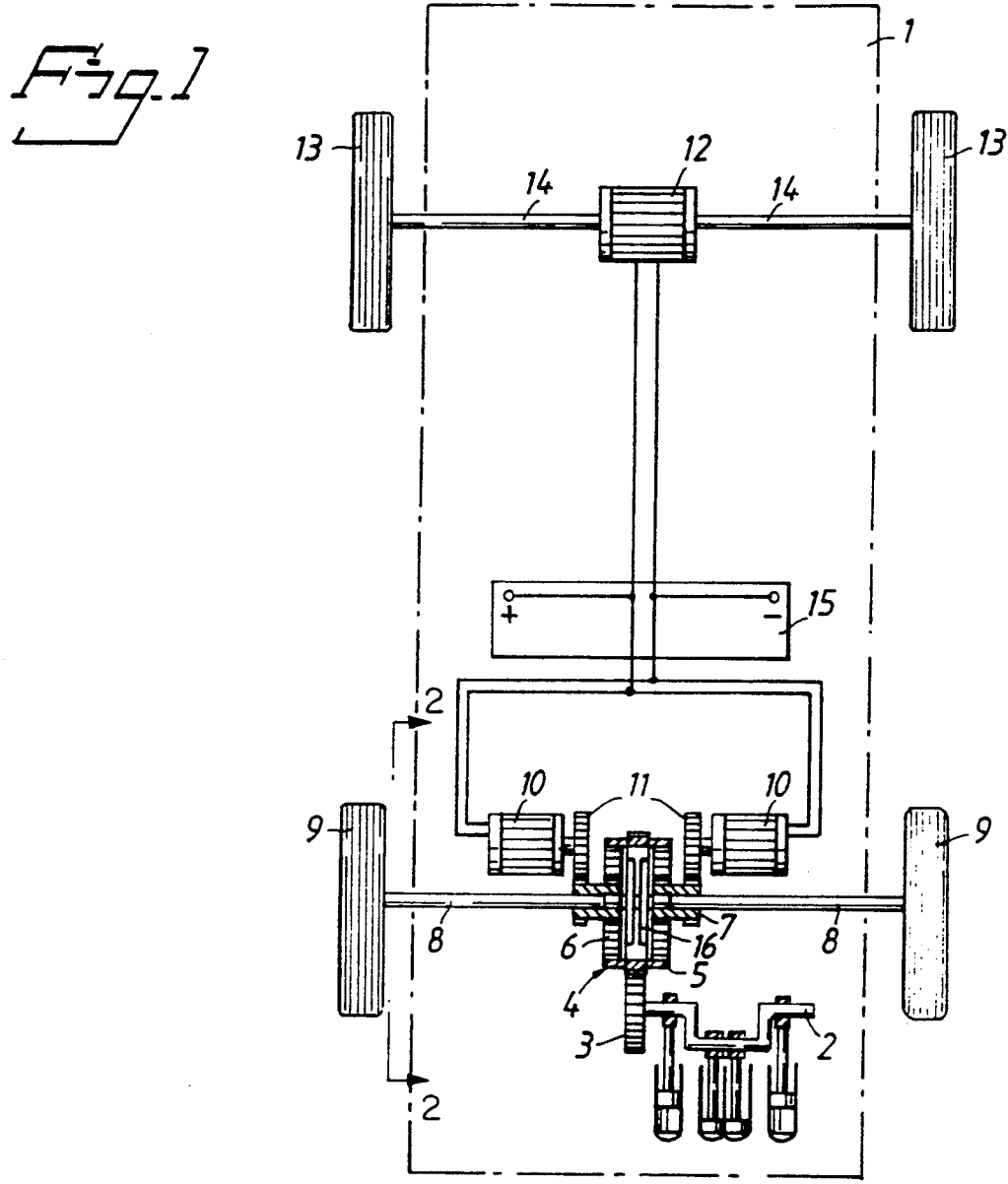
FIG. 1 is a schematic top view of a vehicle provided with an inventive transmission system.

FIG. 1 illustrates a vehicle 1 provided with a power plant 2, for instance an internal combustion engine. Connected to the engine 2 is a power transmission gear 3 which functions to transmit driving torque to a planetary gear means 4. The planetary gear means comprises an outer ring 5 which is operative to transmit said torque to planetary gears 6 and a sun gear 7, which are rotatably journaled on a shaft 8 which functions to drive vehicle wheels 9. The relative speed between the outer ring 5 and the drive shaft 8 is controlled by a motor generator 10 which coacts with a gear transmission means 11 in a manner to enable the generator to continuously vary the speed of the sun gear 7. As will be seen from FIG. 1, the inventive system also includes a further motor generator 12, which functions to transmit driving torque to a second pair of driven vehicle wheels 13, via a drive shaft 14. This control of the speed of the drive shaft 8 results in the generation of electric current which can be used for charging a battery 15 and also for driving the further motor generator 12.

Figure 2:
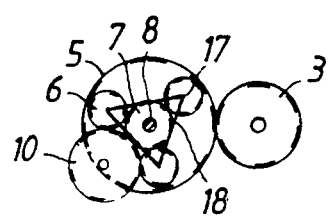
FIG. 2 is a schematic view of a portion of the transmission system in of FIG. 1 taken generally along line 2—2.

In the illustration of FIG. 2, an imaginary triangle 18 has been drawn with the corners of the triangle lying on the journaling points 17 of the planet gears 6. This triangle is assumed to lie on an end plate 16 (FIG. 1) mounted on the drive shaft 8, which is rigidly connected to the journaling points of the planet gears. The illustrated arrangement is such that when, for instance, the sun gear 7 is retarded by the motor generator 10 through the gear transmission means 11, the journaling points 17 of the planet gears 6 will rotate independently thereof around the gear centre and therewith rotate the drive shaft 8. When the outer ring 5, and therewith also the planet gears 6, is driven by the power plant or internal combustion engine 2, via the power transmission gear 3, the drive shaft 8 and the sun gear 7 are caused to rotate by the planet gears 6, this rotation being transmitted through the gear transmission means 11 and driving the motor generator 10 as an electric generator for charging the battery 15. Since the sun gear 7 is rotatably journaled on the drive shaft 8, the rotational speed thereof is independent of the rotational speed of the drive shaft but dependent on the resistance exerted by the motor generator 10.

The novelty of the present invention thus resides in the fact that the forward speed of the vehicle can be controlled with the aid of the motor generators 10, by controlling the relative speed of the gears in the planetary gear means 4, therewith enabling the speed of the drive shaft or shafts 8 to be varied continuously. Surplus energy generated by the motor generator or generators 10 can be used to drive the further motor generator 12 which drives the vehicle wheels 13 on the wheel axles 14. The power transmission gear 3 may comprise several torque transmission gears capable of being engaged and disengaged selectively to achieve mutually different transmission ratios. Although not shown, the inventive system includes means for locking the outer ring 5 of the planetary gear means when the vehicle 1 is propelled solely by the motor generators 10 and/or the further motor generator 12. The invention also enables energy to be recovered through the motor generators 10 and 12 when braking the engine of the vehicle.

The drive transmission can be suitably constructed so that when starting the vehicle and driving said vehicle at low speeds, i.e. speeds beneath about 53 km/hour, and also when reversing the vehicle, the vehicle will be driven solely by the motor generators 10, 10, 12. When the vehicle is driven at a speed of about 53 km/hour to 106 km/hour, the power plant, or engine 2 is engaged, wherein speed control is effected when rotation of the sun gear 7 is retarded (negative rotation) by the motor generators 10, 10. The battery 15 is therewith recharged and surplus energy is consumed by the further motor generator 12. Thus, the batteries will be recharged optimally on each occasion, which is highly beneficial in view of the fact that heavy, momentary booster charging of the battery results in the generation of undesirable heat.

For the purpose of enabling the vehicle to be driven at higher speeds than 106 km/hour, for instance when overtaking, (e.g. an overtaking speed of 159 km/hour) while retaining vehicle traction, it is possible in accordance with the invention to drive the motor generators 10, 10 with energy taken from the vehicle battery and therewith achieve reversed relative speed of the sun gear 7 (positive rotation), which therewith causes the drive shaft 8 to be rotated at a higher speed.

The speed of the power plant 2 can be varied from between 1800 and 3600 rpm, within a vehicle speed range of 53-106 km/hour, without the sun gear 7 rotating, which enabies the vehicle to be propelled in the manner of a conventional vehicle within these limits, or alternatively at a constant power-plant speed (selective) and the speed controlled by supplying energy from the battery 12 (positive rotation of the sun gear 7).

A suitable battery rating is about 200 Ampere hour which gives an action radius of about 30 km at a vehicle speed of 50 km/hour, while recovering energy when braking the vehicle power unit through the motor generators 10, 10 and 12.

I claim:

1. A vehicle transmission system having a drive shaft or drive shafts which can be driven continuously at varying speeds, said system comprising a combination of at least one motor generator and at least one planetary gear means having an outer ring, a planet gear and a sun gear, wherein the motor generator engages the sun wheel through the intermediary of a gear transmission means; wherein the relative speed between said outer ring and said drive shaft or shafts is controlled by supplying energy to and taking energy from said motor generator; wherein the sun gear is rotatably journaled to the drive shaft or shafts; wherein said drive shaft or shafts is, or are, rigidly connected to the journal points of the planet gears; and wherein a force transmission gear is provided for transmitting the primary force from the motor generator to the outer ring.

2. The transmission system of claim 1, wherein the journaling points of the planet gears lie on an end plate mounted on the drive shaft or respective drive shafts, and wherein said shaft or shafts is or are rigidly connected to the jounaling points of the planet gears.

3. The transmission system of claim 1 wherein the system comprises two planetary gear means which are arranged in mirror image with one another and each of which includes a respective drive shaft and a respective motor generator with gear transmission means.

4. The transmission system of claim 3, wherein the two planetary gear means have a common outer ring.

5. The transmission system according to claim 1, wherein said system includes a further motor generator which when the vehicle is driven forwards takes energy generated by the motor generators.

* * * * *